United States Patent
Chen et al.

(10) Patent No.: US 10,612,373 B2
(45) Date of Patent: Apr. 7, 2020

(54) ADD-ON ANTENNAS FOR EXTENDING ELECTROMAGNETIC MEASUREMENT RANGE DOWNHOLE

(71) Applicant: Halliburton Energy Services, Inc., Houston, TX (US)

(72) Inventors: Hau Jiun Chen, Houston, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 15/740,569

(22) PCT Filed: Aug. 28, 2015

(86) PCT No.: PCT/US2015/047521
§ 371 (c)(1),
(2) Date: Dec. 28, 2017

(87) PCT Pub. No.: WO2017/039592
PCT Pub. Date: Mar. 9, 2017

(65) Prior Publication Data
US 2018/0195382 A1 Jul. 12, 2018

(51) Int. Cl.
*E21B 49/00* (2006.01)
*G01V 3/28* (2006.01)
(Continued)

(52) U.S. Cl.
CPC ............... *E21B 49/00* (2013.01); *E21B 47/01* (2013.01); *E21B 47/024* (2013.01);
(Continued)

(58) Field of Classification Search
CPC .......... G01V 3/28; E21B 47/122; E21B 47/01
See application file for complete search history.

(56) References Cited

U.S. PATENT DOCUMENTS

| | | | |
|---|---|---|---|
| 2003/0010534 A1* | 1/2003 | Chen | ................... E21B 7/067 175/61 |
| 2004/0060708 A1 | 4/2004 | Clark et al. | |

(Continued)

FOREIGN PATENT DOCUMENTS

| | | |
|---|---|---|
| WO | 2014210513 A1 | 12/2014 |
| WO | 2017039592 A1 | 3/2017 |

*Primary Examiner* — Alvaro E Fortich
(74) *Attorney, Agent, or Firm* — Jason Sedano; Parker Justiss, P.C.

(57) ABSTRACT

An illustrative electromagnetic logging while drilling system includes a drill string having a bottomhole assembly with a bit that operates to extend a borehole; and further includes a removable add-on antenna unit that cooperates with at least one other antenna unit in the drill string to provide electromagnetic signal measurements indicative of at least one formation property. Some embodiments of the add-on antenna unit encircle an existing tool or tubular, attaching to a sidewall readout port to receive power and exchange communications over the internal tool bus with at least one other antenna unit. At least one disclosed method embodiment includes: assembling the bottomhole assembly; securing at least one add-on antenna unit around a downhole tool or tubular in the bottomhole assembly; and using the at least one add-on antenna unit in combination with at least one other antenna in the bottomhole assembly to obtain electromagnetic signal measurements formation properties.

20 Claims, 4 Drawing Sheets

(51) Int. Cl.
*E21B 47/01* (2012.01)
*E21B 47/12* (2012.01)
*E21B 47/024* (2006.01)
E21B 7/04 (2006.01)
E21B 47/18 (2012.01)

(52) U.S. Cl.
CPC .............. *E21B 47/122* (2013.01); *G01V 3/28* (2013.01); *E21B 7/04* (2013.01); *E21B 47/18* (2013.01)

(56) References Cited

U.S. PATENT DOCUMENTS

| | | | |
|---|---|---|---|
| 2007/0216415 A1* | 9/2007 | Clark | E21B 47/011 324/338 |
| 2007/0256839 A1* | 11/2007 | Moynahan | B08B 9/023 166/312 |
| 2009/0302851 A1* | 12/2009 | Bittar | E21B 47/026 324/338 |
| 2013/0226461 A1 | 8/2013 | Yu et al. | |
| 2014/0020908 A1 | 1/2014 | Wright et al. | |
| 2014/0032116 A1* | 1/2014 | Guner | G01V 3/28 702/6 |
| 2015/0212225 A1* | 7/2015 | Reiderman | G01N 24/081 324/303 |

\* cited by examiner

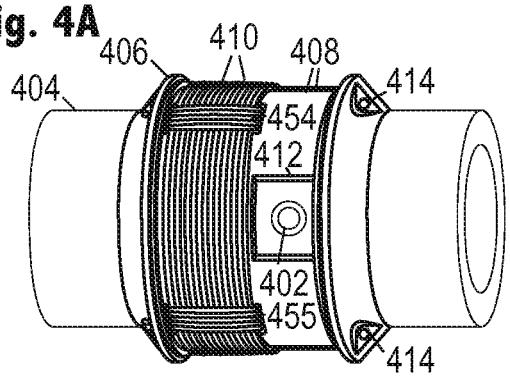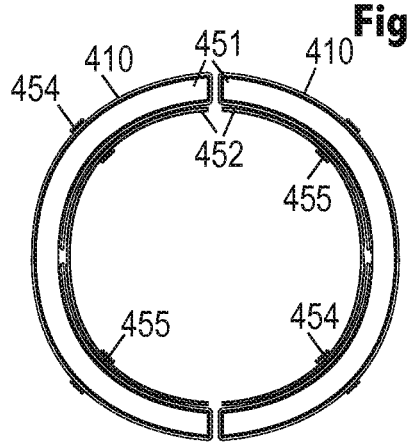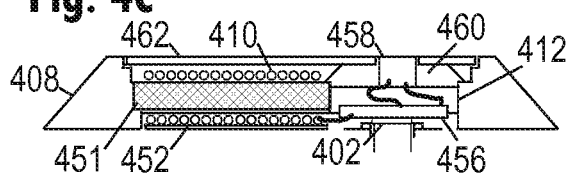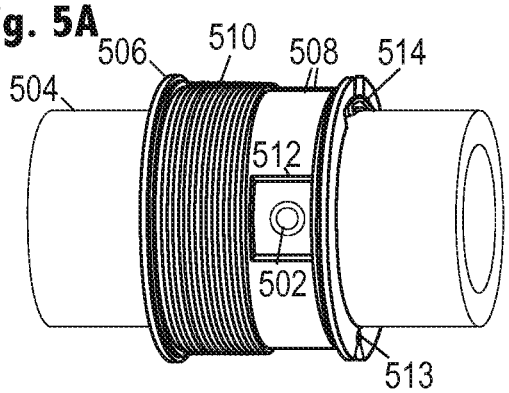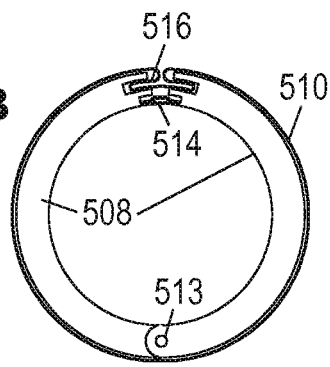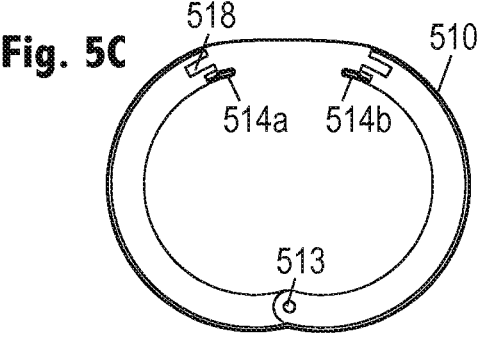

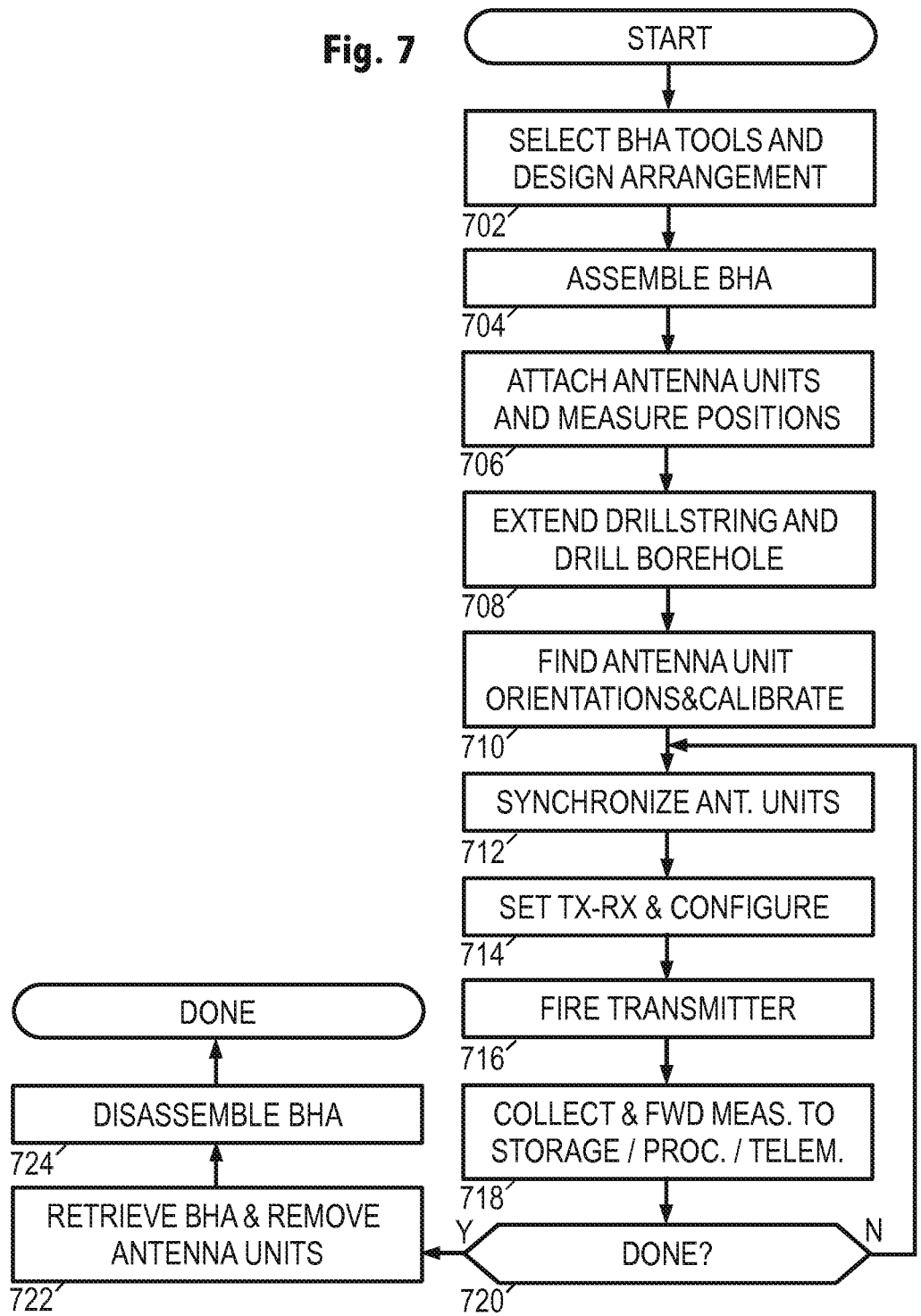

ADD-ON ANTENNAS FOR EXTENDING ELECTROMAGNETIC MEASUREMENT RANGE DOWNHOLE

CROSS-REFERENCE TO RELATED APPLICATION

This application is the National Stage of, and therefore claims the benefit of, International Application No. PCT/US2015/047521 filed on Aug. 28, 2015, entitled "ADD-ON ANTENNAS FOR EXTENDING ELECTROMAGNETIC MEASUREMENT RANGE DOWNHOLE," which was published in English under International Publication Number WO 2017/039592 on Mar. 9, 2017. The above application is commonly assigned with this National Stage application and is incorporated herein by reference in its entirety.

BACKGROUND

The gathering of downhole information has been done by the oil well industry for many years. Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging", and can be performed during the drilling process itself.

Various measurement tools exist for use in wireline logging and logging while drilling ("LWD"). One such tool is the electromagnetic logging tool, which includes one or more antennas for transmitting an electromagnetic signal into the formation and one or more antennas for receiving a formation response. When operated at low frequencies, the electromagnetic logging tool may be called an "induction tool", and at higher frequencies it may be called an "electromagnetic wave propagation tool". Though the physical phenomena that dominate the measurement may vary with frequency, the operating principles for the tool are consistent. The amplitude and/or the phase of the receive signals may be compared to the amplitude and/or phase of the transmit signals to measure electrical properties of the formation (e.g., conductivity, permittivity). Alternatively, the amplitude and/or phase of multiple receive signals are compared to each other to measure the formation properties. Where the tools are configured to provide measurements at multiple signal frequencies, multiple antenna spacings, and/or multiple orientations, additional information can be derived including, for example, the dependence of the formation properties on azimuth and radial distance from the borehole. Such information is particularly valued for guidance when steering the drilling assembly.

In certain situations, such as when drilling through formations in which the formation boundaries extend vertically, or when drilling from an off-shore platform, it is desirable to drill wells at a shallow angle with respect to bed boundaries in the strata. This is often termed "horizontal" drilling. When drilling horizontally, it is desirable to maintain the well bore in the pay zone (the formation which contains hydrocarbons) as much as possible so as to maximize the recovery. However, due to the drilling assembly's limited turning radius, such pay zone following can be challenging, particularly when the formations dip or divert.

While attempting to drill and maintain the well bore within a particular formation, the drill bit may approach a bed boundary. Such approaches are preferably detected as early as possible to provide the drill crew with sufficient time to react. As the detection distance can be increased with lower frequencies and larger antenna separations, certain tool designs employ multiple electromagnetic logging tools in the drilling assembly, optionally separating them by one or more intermediate tools or tubulars. Electromagnetic signals transmitted from one of the various electromagnetic logging tools are received by the others, so that they collectively operate as modules of one combined electromagnetic logging tool. These tool designs permit customizable antenna positioning and spacings, within certain limits set by the given lengths of existing tools and tubulars selected for use in the drilling assembly. These limits are believed to be inconvenient and overly restrictive.

BRIEF DESCRIPTION OF THE DRAWINGS

Accordingly, there are disclosed in the drawings and the following description various systems and methods providing add-on antennas for extended electromagnetic measurement range downhole. In the drawings:

FIG. 4A is an isometric view of an illustrative add-on antenna unit.

FIGS. 4B-4C are cross-sections of an illustrative add-on antenna unit.

FIG. 5A is an isometric view of an alternative add-on antenna unit embodiment.

FIG. 5B is a cross-section of the alternative unit in a closed configuration.

FIG. 5C is a cross-section of the alternative unit in an open configuration.

FIG. 7 is a flowchart of an illustrative electromagnetic LWD method.

Figure 1:
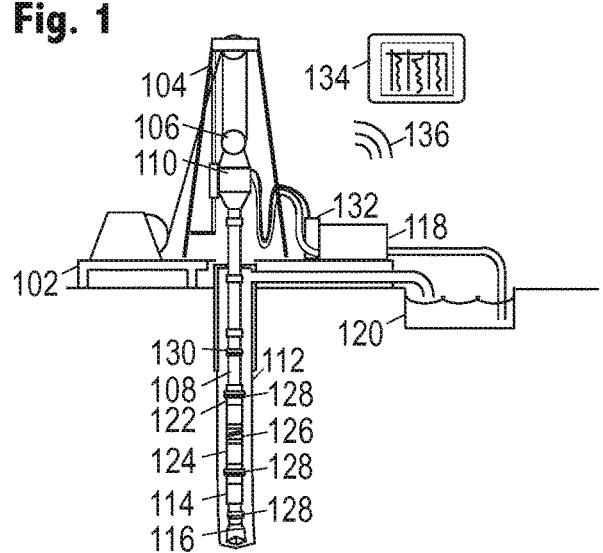
FIG. 1 is a schematic view of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The disclosed systems and methods provide a drilling assembly with one or more add-on antenna units which can operate cooperatively with each other and/or with an electromagnetic logging while drilling tool to obtain electromagnetic signal measurements indicative of formation properties such as conductivity, permittivity, bed boundary distance, and bed boundary direction. The add-on antenna units attach to existing downhole tools or tubulars to provide for increased configuration flexibility in the bottomhole assembly.

The disclosed systems and methods are best understood in their intended usage context. Accordingly, FIG. 1 shows an illustrative drilling environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As bit 116 rotates, it extends the borehole 112 through various subsurface formations. A pump 118 circulates drilling fluid through a feed pipe to the top drive assembly, downhole through the interior of drill string 108, through orifices in drill bit 116, via the annulus around drill string 108 back to the surface, and into a retention pit 120. The drilling fluid transports cuttings from the borehole into the pit 120 and aids in maintaining the borehole integrity.

The drill bit 116 and motor assembly 114 form just one portion of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, a bottomhole assembly telemetry and navigation tool 122 includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Among the other tools integrated into the bottomhole assembly may be an electromagnetic logging tool 124 having an antenna arrangement 126. The illustrative bottomhole assembly further includes a set of add-on antenna units 128 secured to one or more drill collars in the bottom hole assembly. As the host drill collars are pre-existing tools or tubulars, no dedicated subs are required to integrate the additional antennas into the drill string, thus providing greater flexibility in arranging the various tools and potentially reducing the overall length of the bottomhole assembly. Some of the add-on antenna units 130 may even be secured to drill pipe or other tubulars that are not necessarily equipped with internal electronics. The add-on antenna units may obtain electromagnetic signal measurements in response to transmissions from other add-on antenna units and/or the electromagnetic logging tool 124. Alternatively, at least some of the add-on antenna units may transmit electromagnetic signals that enable other add-on antenna units and/or the electromagnetic logging tool 124 to obtain electromagnetic signal measurements.

As the bit 116 extends the borehole through the subsurface formations, or as the drill string is tripped from the borehole, the add-on antenna units cooperatively provide measurements of electromagnetic signal properties such as amplitude (attenuation) and phase (delay) as a function of tool position and orientations. The literature provides numerous ways to derive formation properties (e.g., conductivity, permittivity, bed boundary distances, bed boundary directions) from such electromagnetic signal measurements including: model-based inversion, conversion tables derived from numerical simulation, and adaptive neural networks. The measurements or derived properties can be stored in internal memory and/or communicated to the surface. The telemetry and navigation tool 122 is included in the bottom-hole assembly to maintain a communications link with the surface. Mud pulse telemetry is one common telemetry technique for transferring tool measurements to a surface interface 132 and to receive commands from the surface interface, but other telemetry techniques can also be used.

A processing unit, shown in FIG. 1 in the form of a tablet computer 134, communicates with surface interface 132 via a wired or wireless network communications link 136, and provides a graphical user interface (GUI) or other form of interface that enables a user to provide commands and to receive and optionally interact with a visual representation of the formation properties. The visual representation may be in log form, e.g., a graph or image of the property value as a function of position along the borehole. The processing unit can take alternative forms, including a desktop computer, a laptop computer, an embedded processor, a cloud computer, a central processing center accessible via the internet, and any combination of the foregoing, with software that can be stored in memory for execution by the processor. The software, which can be supplied on a non-transient information storage medium, configures the processing unit to interact with the user to obtain, process and display the tool measurements and derived formation properties.

Figure 2:
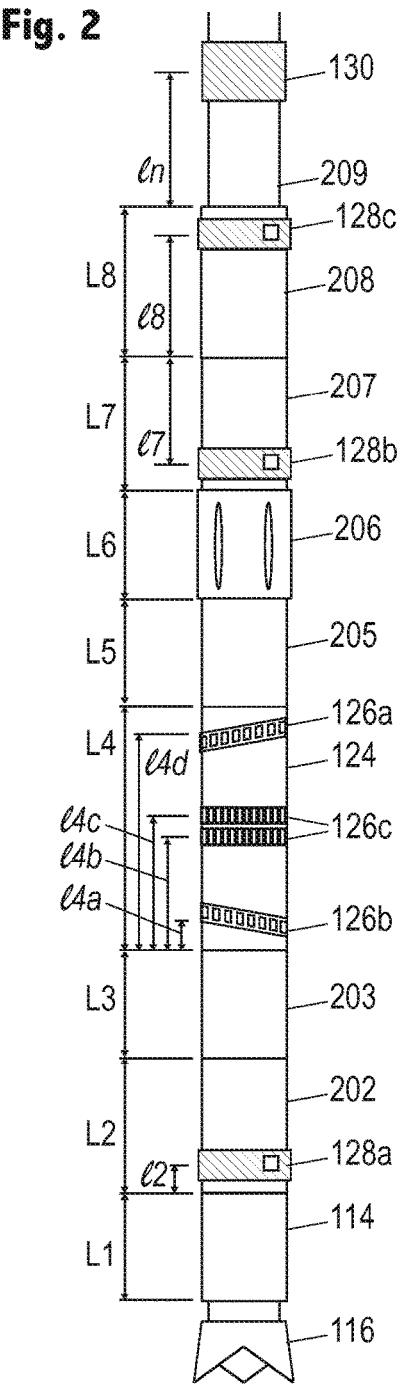
FIG. 2 is a side view of an illustrative portion of a drilling assembly.

FIG. 2 is a side view of a bottomhole assembly having an arrangement of eight drill collars to provide weight and rigidity to drive the bit 116 forward. At least some of the drill collars provide additional functionality. Motor assembly 114 rotates the bit 116 to speed the drilling process, and may further provide steering capability. The illustrated electromagnetic logging tool 124 includes an azimuthally-sensitive configuration of antennas 126a-126c with transmitters and receivers to acquire electromagnetic signal measurements that may enable determination of bed boundary directions expressible in terms of relative azimuth and relative dip from the tool to a nearest point on the boundary. (Co-axial antenna arrangements without azimuthal sensitivity are also contemplated.) The other collars 202, 203, 205, 206, 207, 208, may optionally include tools for telemetry, navigation, monitoring drill parameters, collecting formation parameter measurements, and stabilizing or steering the drill string.

Figure 3:
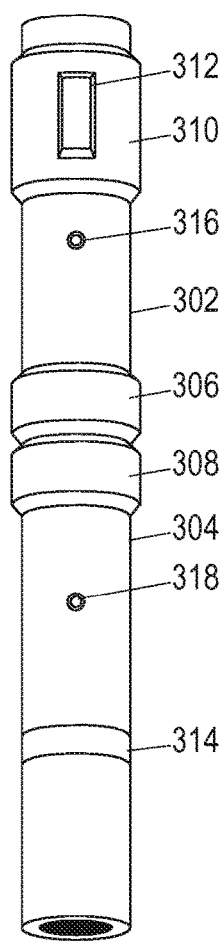
FIG. 3 is an isometric view of illustrative LWD tools with sidewall readout ports.

Turning momentarily to FIG. 3, additional detail for two such tools can be seen in an isometric view. A density logging tool 302 and a drilling parameter monitor (e.g., DrillDOC®) 304 are joined by a connection positioned between two wear bands 306, 308. The density logging tool 302 includes a shoulder 310 with protruding stabilizer fins 312 to position a radiation source and detectors near the borehole wall. The drilling parameter monitor includes a set of strain gauges 314 embedded in the wall to measure deformations indicative of weight on bit, torque on bit, vibration, etc. Each tool has an internal bus, and these internal tool buses are typically joined together by the connection to transfer power and communications between the tools. As additional tools are connected, the internal tool buses are extended to enable power and communications to be transferred along the full length of the tool assembly.

Both illustrated tools include sidewall readout ports 316, 318, which provide wired connectivity to internal tool buses in the respective tools. (Though galvanic coupling is preferred, some contemplated readout port embodiments employ capacitive or inductive coupling to the readout instruments.) Such ports facilitate testing, calibration, and programming of the tools before deployment, and can also be used for data retrieval or troubleshooting after the tools have been retrieved to the surface. So long as at least one tool has a sidewall readout port, such activities can be performed on all tools that are accessible via the internal tool bus.

At least some of the add-on antenna units disclosed herein exploit the presence of sidewall readout ports in existing tools by using such ports to connect with the internal tool bus. Accordingly, in FIG. 2, collars 202, 207, and 208 represent tools equipped with sidewall readout ports. Add-on antenna units 128a-128C are secured to collars 202, 207, and 208, respectively are coupled to the internal tool buses via the respective sidewall readout ports. Power and communications for the add-on antenna units are obtained via these ports.

However, some of the add-on antenna units disclosed herein are wireless units having compact, high energy density battery packs. Available battery types include lithium-based batteries (including lithium thionyl chloride), nickel-based batteries (including nickel-metal hydride), graphene-based batteries, molten salt batteries, liquid metal batteries, and kinetic-energy harvesters. As receiving typically requires less power than transmitting, the wireless units may be primarily used for receiving electromagnetic signals and communicating the measurements via short hop telemetry to a master unit. Since such add-on antenna units do not need to connect with a sidewall readout port, there is greater flexibility in positioning them. In FIG. 2, add-on antenna unit 130 is secured to a section of drill pipe 209.

Each of the n drill collars has a length $L_i$ (i=1, 2, ..., n) that is typically known, but in any event can be measured and entered into a database. Similarly, the positions and orientations of each antenna on the electromagnetic logging tool 124, $l_{4k}$ (k=a, b, c, d) are typically known, but in any event can be measured. The orientation of any tilted-dipole antenna may be expressed in terms of a non-zero tilt angle relative to the drillstring axis (up to and including 90°) and a skew angle between a tool reference direction (typically defined with a scribe line on the tool's circumference and parallel to the tool axis) and a projection of the antenna dipole onto a plane perpendicular to the drillstring axis. The position of a tilted-dipole antenna corresponds to the intersection of the tilted dipole with the tool axis.

An important bit of additional information is the relative position of all antennas in the bottomhole assembly, and accordingly, as the add-on antenna units are secured, their positions $l_i$ are measured relative to either end of the drill collar. These positions, combined with the lengths and arrangement of the bottomhole assembly, enable determination of the position of each antenna relative to the others and relative to the bit or navigation tool.

FIG. 4A shows a sidewall readout port 402 of a tool 404, and an illustrative add-on antenna unit 406 with a protective sleeve removed to show more detail. With reference to the cross-sections in FIGS. 4B-4C, it can be seen that the illustrative add-on unit 406 includes two halves 408 that together encircle the tool 404. The two halves 408 may include cores of ferritic or other high-permeability material 451 wound with a coil antenna 410, which in the figure is oriented to produce a magnetic field parallel to the tool axis. At least one of the halves 408 includes a cavity 412 that serves as a recess for holding an electronics module 456 (FIG. 4C) and optionally provides direct access to the sidewall readout port 402. After mating one half 408 with the sidewall readout port 402 and positioning the second half 408 against the first, the two halves are attached together by threaded fasteners 414, thereby securing the add-on antenna unit 406 to the tool 404.

FIG. 4B is a transverse cross-section of the halves 408, showing one winding of coil antennas 410 around semi-cylindrical cores of high permeability material 451 (best seen in FIG. 4C). Inner shells 452 force the winding to follow the inner contours of the core, preserving an inner space for accommodating the tool 404. Coil antennas 410 provide a magnetic field in the longitudinal, or z-axis, direction. FIGS. 4A and 4B further show optional transverse coil antennas 454 for the x-axis, and transverse coil antennas 455 for the y-axis. In other embodiments, the coil antenna 410 is wound at an angle to provide azimuthal sensitivity without requiring a multi-component antenna configuration.

FIG. 4C is a longitudinal cross-section of one portion of unit 406. An electronics module 456 is shown as plugged in to the sidewall readout port 402. The electronics module 456 is wired to the coil antenna 410 for transmitting and/or receiving electromagnetic signals suitable for measuring formation properties. In the illustrated embodiment, the electronics module 456 is further wired to a sidewall readout port extension 458, mounted in a cover 460 of the recess 412. The extension 458 enables the functionality of the sidewall readout port 402 to be accessed while the add-on antenna unit 406 is in place.

A sleeve 462 protects the electronic components of the unit 406. The sleeve may be a unitary sleeve that can be expanded to slip over the two halves of the add-on antenna unit 406, or alternatively may be configured as separate sleeves for each half 408. The sleeve 462 may consist of an insulating material such as ceramic or fiberglass, or may be slotted to suppress circumferential current flow that would otherwise degrade the performance of the antenna 410. Any otherwise empty space in recess 412 or elsewhere underneath sleeve 462 may be filled by a resin or a resilient material to cushion vibrations and resist fluid invasion.

While the field pattern of a coaxial antenna is best approximated by driving the coil antennas 410 in phase at equal currents, it is also contemplated that the amplitude and/or phases of the currents could be varied to modify the field pattern and potentially introduce some azimuthal sensitivity to the measurements. Moreover, the number of coils 410 may be increased, with a commensurate decrease in coil size, to provide 4, 8, or more independently-drivable sectors with adjustable amplifiers that enable the set of coils to be driven in a phased-array fashion.

FIG. 5A shows an alternative add-on antenna unit embodiment that can be coupled to a sidewall readout port 502 of a downhole tool 504. The illustrated unit 506 is shown partially assembled to reveal additional detail regarding its construction. With reference to the cross-sections in FIGS. 5B and 5C, it can be seen that the unit 506 includes two halves 508 connected by a hinge 513 to encircle the tool 504. As before, the two halves may include a high permeability material underlying the antenna coil 510, which in the figure is oriented to produce a magnetic dipole field parallel to the tool axis. The illustrative embodiment includes a cavity 512 for holding an electronic module and enabling access to the sidewall readout port 502. The windings of coil 510 are provided with extra length 516, enabling the halves 508 to be moved between an open configuration (FIG. 5C) and a closed configuration (FIG. 5B). In the closed configuration, a niche 518 receives the extra length 516 in a manner that minimizes any field contribution from the excess length. (As opposed to folding in the circumferential direction, some contemplated embodiments fold the extra length 516 in a direction parallel to the tool axis.)

In the open configuration, the extra length 516 enables the add-on antenna unit to slip over the end of the tool and be moved into position. Once in the desired position, the two halves 508 are closed together, bringing metal loops 514*a* and 514*b* together in an interleaved fashion that forms a keyway 514. A locking pin ("key") is hammered into the keyway, thereby pulling the loops into perfect alignment and locking the unit in the closed position. The tension created in the loops creates sufficient frictional forces to secure the key and the unit in place. In some variations, the unit includes one or more notches that mate with the read-out port and/or with cogs on the tool body to secure the unit in place. Heavy grease, silicone, or a resilient foam material may be employed in niche 518 to suppress movement of the extra length 516 during the drilling operation.

Yet another mechanism for securing the halves 408, 508 to the tool 404, 504 includes one or more "hose clamps" having screw threads that engage apertures in a metal strap to tighten the metal strap around the add-on unit 406. Any suitable fastening mechanism may be used, though mechanisms that enable fast release while remaining robust against accidental release by downhole forces and vibrations caused by the drilling process may be preferred.

Figure 6:
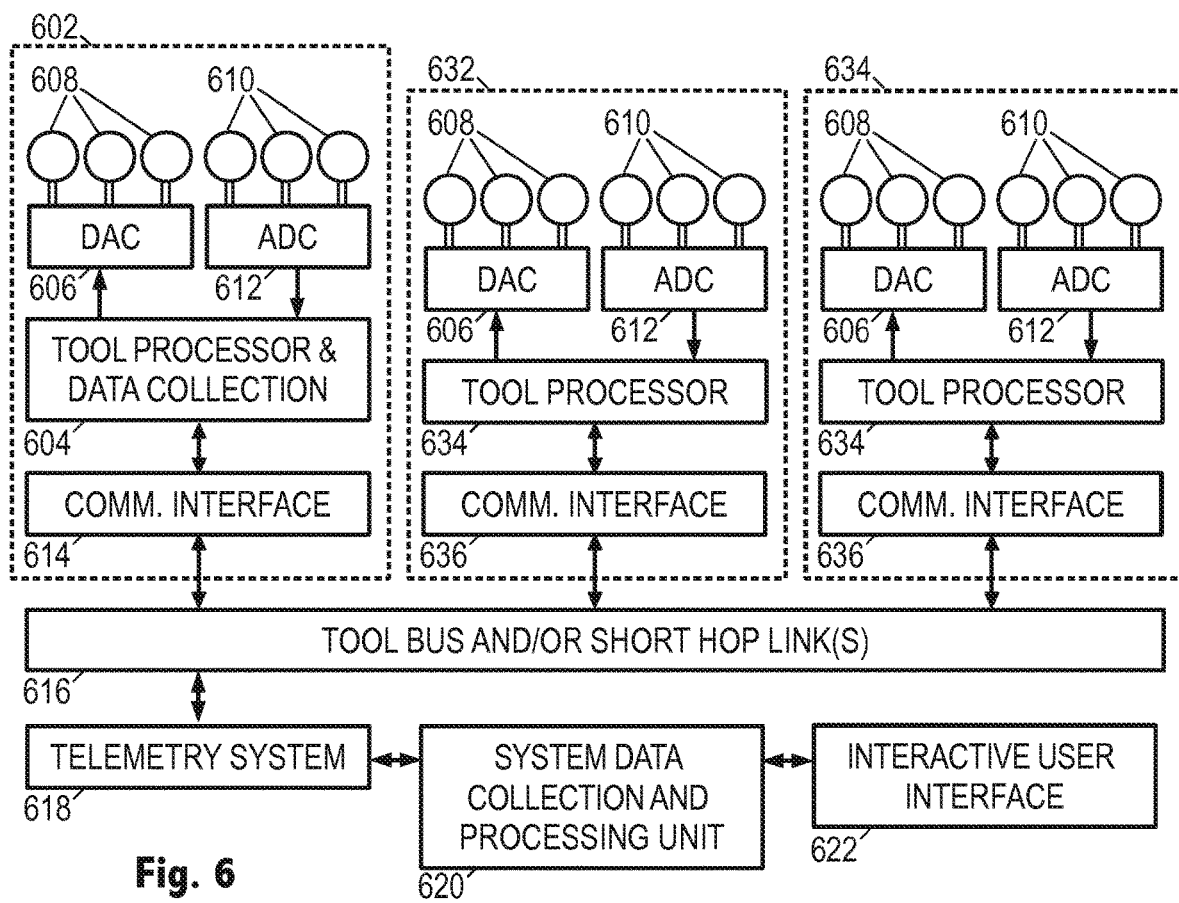
FIG. 6 is a block diagram of an illustrative electromagnetic LWD system.

FIG. 6 is a block diagram of an illustrative electromagnetic LWD system having a master antenna unit 602 and one or more add-on antenna units 632, 634. It is contemplated that the master antenna unit 602 comprises an electromagnetic logging while drilling tool 124 that is self-sufficient for collecting formation property measurements, yet which has been programmed to coordinate with the one or more add-on antenna units 632, 634 to take advantage of the increased antenna separations and thereby extend its measurement range. In other embodiments, the master antenna unit 602 is itself an add-on antenna unit 128 that is configured to operate as a system controller for the electromagnetic LWD system.

The master antenna unit 602 includes a processor 604 or other programmable control circuit coupled to a digital-to-analog converter (DAC) 606 to drive selected coil antennas 608 for transmitting electromagnetic signals into the surrounding formation. As the electromagnetic signals propagate, they partially reflect from boundaries, induce currents, and otherwise interact with the formation to produce electromagnetic response signals having phase changes and attenuation relative to the transmitting signals. Coil antennas 610 sense the response signals, which may undergo analog amplification and processing before being digitized by analog-to-digital converter (ADC) 612. The processor 604 obtains the local measurements of attenuation and phase from ADC 612 and collects via communications interface 614 the corresponding measurements from the cooperating add-on antenna units 632, 634. Communications interface 614 enables processor 604 to access the other tools and devices coupled to the internal tool bus 616, including those that are coupled to the bus 616 via short-hop communications links. Among the other tools and devices on tool bus 616 are the add-on antenna units 632, 634, and an interface to the telemetry system 618. Telemetry system 618 provides communication between the bottomhole assembly and the surface interface. Various suitable telemetry systems are known and can be used, including mud pulse telemetry systems.

The processor 604 stores the measurements with optional downhole processing to enhance measurement quality and to provide compact representation. Such optional processing may include exclusion of outliers and deriving averages of repeated measurements. The processor 604 communicates measurements via telemetry system 618 to the data collection and processing unit 620 on the surface. The data collection and processing unit 620 collects and processes not only the information from the master antenna unit 602, but also from the other tools and devices in the bottomhole assembly and in the surface drilling rig, enabling the processing unit to combine and correlate the information from the various sources to derive and display logs of the desired formation properties, including those properties derivable from the electromagnetic signal measurements. An interactive user interface 622 enables a user to view the various formation property logs and to optionally alter the configuration and operation of the tools collecting the formation property measurements. Moreover, the user may be able to steer the drilling assembly based on the derived formation properties.

The add-on antenna units 632, 634 each include one or more coil antennas 608, 610. Some add-on antenna units include only receiver coil antennas. Some add-on antenna units include only transmitter coil antennas. Some add-one antenna units include both receiver and transmitter coil antennas. Some add-on antenna units include one or more coil antennas that are switchable between transmission and reception. The processor 634 or control circuitry of the add-on antenna units 632, 634 preferably inventories the antennas and their capabilities, and, when queried via the sidewall readout port-based communications interface 636, reports this information to the master antenna unit 602. Thereafter, the processor 604 in the master unit coordinates the cooperative operation of all the antenna units, synchronizing timing, selecting active transmitters, and collecting measured responses to each transmitter firing.

FIG. 7 is a flowchart of an illustrative electromagnetic LWD method. It begins in block 702 with the determination of the set of tools that are to be included in the bottomhole assembly. This determination is based on the desired downhole data and actions that are to be performed on the given run. Normally, the selected set of tools permits some degree of flexibility in their arrangement, such that the order of certain tools may be interchanged. To the extent permitted by other restrictions on tool order, we herein propose modifying the arrangement to position tools equipped with sidewall readout ports in a desirable spatial relationship for electromagnetic logging, so that these tools may be equipped with add-on antenna units in desirable locations. At least some contemplated method embodiments treat a maximal separation between a transmit and receive antenna (subject to an expected range of the given electromagnetic signal frequency) as a desirable spatial relation. The contemplated method embodiments may further treat as desirable the positioning of an add-on antenna unit as near the bit as possible, and may further favor a symmetric arrangement as well as an arrangement that provides some redundancy to protect against the failure of any one antenna unit. Where it is not feasible via simple rearrangement to locate a sidewall readout port in a desirable location, the sidewall readout port may be positioned within short-hop telemetry range of the desirable position to support communication with a wireless add-on antenna unit. The wireless add-on antenna unit may communicate to the internal tool bus via an add-on short-hop telemetry unit that couples to the sidewall readout port.

In block 704, the drilling crew assembles the bottomhole assembly in the chosen arrangement, and in block 706, the crew attaches the add-on antenna units to the bottomhole assembly in the desired positions. Where sidewall readout ports are available, the add-on antenna units are coupled to the sidewall readout ports. Otherwise, wireless sidewall readout ports are secured at the desired locations. The exact placement of the add-on antenna units relative to the tool ends is measured to enable, in combination with knowledge of the tool lengths, determination of the precise inter-antenna spacings. In block 708, the drilling crew extends the drillstring to lower the bottomhole assembly to the bottom of the borehole and drills to extend the borehole.

During the drillstring rotation associated with the drilling process, the master antenna unit communicates with the add-on antenna units to establish an initial synchronization and to begin sending test signals. The test signals are used to determine the relative orientations of the add-on antenna units and to adjust the gain factors in the transmit and/or receive circuitry as needed to make optimal use of the range of the analog-to-digital converters. Orientation information can alternatively be obtained using existing orientation sensors in or near the various antenna units and associating those readings with the sidewall readout port orientation. As another option, the add-on antenna units may each include orientation sensors.

Blocks 712-720 form a loop that is repeated throughout the logging process. In block 712, the master unit conducts a synchronization exchange with each of the add-on antenna units. Each synchronization exchange consists of a first message sent from the master to the receiver, a second message sent from the receiver to the master, and an optional third message from the master to the receiver. The first message initiates the exchange, and includes a transmission time according to the master clock. The receiver notes the reception time of the first message according to a local clock, and includes that reception time in the second message along with the transmission time of the first message (as reported in the first message) and a transmission time of the second message according to a local clock. The master notes the reception time of the second message according to the master clock. The master then calculates an offset of the local clock relative to the master clock by subtracting the reception time of the second message from the transmission time of the first message, thereby obtaining a total turn-around time, subtracting from that the difference between the second message transmission time and the first message receive time, thereby obtaining a total transit time, and dividing the total transit time in half. The optional third message communicates this clock offset to the receiver.

In block 714, the master antenna unit selects an antenna configuration specifying which antenna is transmitting and which antennas are receiving. This selection may be performed iteratively, with each iteration of the loop being performed for a subsequent configuration in a list of possible antenna configurations. The selection may further include a desired sequence of transmit pulses, a desired set of transmit frequencies, or a desired transmit signal waveform. The master antenna unit notifies each of the antenna units of their roles along with a transmission time, accounting for the various clock offsets. In block 716, the selected transmitter fires at the appointed time and the receivers acquire their measurements. In block 718, the master unit collects the various measurements for storage, processing, and transmission of selected measurements to the surface.

In block 720, the master determines whether the logging process has completed (e.g., rotation has stopped), and if not, the loop repeats from block 712. Otherwise, in block 722, the crew retrieves the bottomhole assembly to the surface, removing add-on antenna units as they do so. In block 724, the bottomhole assembly is disassembled.

In the foregoing discussion, the focus has been to employ add-on antenna units that are readily securable and removable from a drilling assembly without having to provide the units with threaded connections on either side and interleave the units with other desired downhole tools. Such add-on antenna units provide a great deal of flexibility and can even be employed in coil tubing-based drilling systems. Nevertheless, the disclosure can be extended to include add-on antenna units that are perhaps less readily removable. Some contemplated embodiments include unitary cores that are expanded (e.g., by heating) to fit over the end of an existing tool and to slide along the tool to align an aperture with the sidewall readout port. Once the expansion ceases (e.g., by cooling), the core exhibits a secure friction fit to the existing tool. The coil antennas are then wound in place, the electronics module wired to the coil antennas and the sidewall readout port and tested before filler material is added the system of coil antennas and electronics module is secured with a protective sleeve. Such operations can be readily performed in the field to add electromagnetic logging capability to any suitable tool, and they enable additional antenna configurations, including a coil antenna that fully encircles the unitary core.

Numerous variations and modifications will become apparent to those skilled in the art once the above disclosure is fully appreciated. It is intended that the following claims be interpreted to embrace all such variations and modifications where applicable.

Among the embodiments described above are:

Embodiment A: An electromagnetic logging while drilling system that includes a drill string having a bottomhole assembly with a bit that operates to extend a borehole; and at least one add-on co-axial or tilted-dipole antenna unit added on to a tool or tubular in the drill string and encircling said tool or tubular, the at least-one add-on antenna unit cooperating with at least one other antenna in the drill string to provide electromagnetic signal measurements indicative of at least one formation property. The orientation of any tilted-dipole antenna may be expressed in terms of a non-zero tilt angle relative to the drillstring axis (up to and including 90°) and a skew angle between a tool reference direction (typically defined with a scribe line through one point on the tool's circumference) and a projection of the antenna dipole onto a plane perpendicular to the drillstring axis.

Embodiment B: An electromagnetic logging while drilling method that includes: assembling a bottomhole assembly of a drill string including a bit that operates to extend a borehole; securing at least one add-on antenna unit around a downhole tool or tubular in the drill string; and using the at least one add-on antenna unit in combination with at least one other antenna in the drill string to obtain measurements indicative of at least one formation property.

Embodiment C: An add-on antenna unit for securing to a downhole tool in a bottomhole assembly, the unit including at least one coil antenna for cooperating with at least one other antenna unit in the bottomhole assembly to provide electromagnetic signal measurements indicative of at least one formation property; and an electronics module that removably couples to a sidewall readout port in the downhole tool to receive power and to exchange messages with the at least one other antenna unit.

Each of the foregoing embodiments may include one or more of the following features in any combination. Feature 1: the formation property includes at least one of: conductivity, permittivity, distance to a bed boundary, and direction (relative azimuth and/or relative dip) of a bed boundary. Feature 2: the at least one other antenna includes a transmitting antenna of a self-sufficient electromagnetic logging while drilling tool. Feature 3: the at least one other antenna includes a receiving antenna of a second, different add-on antenna unit. Feature 4: the at least one other antenna is spaced apart from said tool or tubular by at least one intermediate tool or tubular. Feature 5: the tool or tubular includes a logging while drilling tool having a sidewall readout port that electrically connects to the at least one add-on antenna unit to provide power and enable communications via an internal tool bus. Feature 6: the at least one add-on antenna unit communicates receive signal parameters to an electromagnetic logging controller via a short-hop wireless communications link. Feature 7: the bottomhole assembly includes an electromagnetic logging controller that synchronizes operation of the at least one add-on antenna unit with operation of the at least one other antenna. Feature 8: the add-on antenna unit includes a ferromagnetic core having an aperture for attaching the electronics module to the sidewall readout port. Feature 9: the add-on antenna unit includes a high-permeability core comprising at least two pieces that are joined to encircle the tool or tubular.

What is claimed is:

1. An electromagnetic logging while drilling system that comprises:
    a drill string having a bottomhole assembly with a bit that operates to extend a borehole; and
    at least one add-on antenna unit, readily securable to and removable from a tool or tubular in the drill string, secured to the tool or tubular in the drill string and encircling said tool or tubular, wherein at least one of the at least one add-on antenna units is not connected to a sidewall readout port of the tool or tubular in the drill string and wherein the at least-one add-on antenna unit:
        cooperates with at least one other antenna in the drill string to provide electromagnetic signal measurements indicative of at least one formation property; and
        is positioned and oriented on the tool or tubular in the drill string in an azimuthally-sensitive configuration to acquire the electromagnetic signal measurements to enable an improved determination of the at least one formation property, thereby providing increased configuration flexibility.

2. The system of claim 1, wherein the at least one formation property comprises at least one of: conductivity, permittivity, distance to a bed boundary, and direction of a bed boundary.

3. The system according to claim 1, wherein the at least one other antenna comprises a transmitting antenna of an electromagnetic logging while drilling tool.

4. The system according to claim 1, wherein the at least one other antenna comprises a receiving antenna of a second add-on antenna unit.

5. The system according to claim 1, wherein the at least one other antenna is spaced apart from said tool or tubular by at least one intermediate tool or tubular.

6. The system of claim 5, wherein said tool or tubular comprises a logging while drilling tool having the sidewall readout port, and wherein the at least one add-on antenna unit electrically connects to the sidewall readout port to receive power.

7. The system of claim 6, wherein the at least one add-on antenna unit communicates over an internal tool bus via the sidewall readout port.

8. The system of claim 6, wherein the at least one add-on antenna unit communicates the electromagnetic signal to an electromagnetic logging controller of the at least one other antenna via a short-hop wireless communications link.

9. The system of claim 8, further comprising a processor in the bottomhole assembly, wherein the processor synchronizes operation of the at least one add-on antenna unit with operation of the at least one other antenna.

10. An electromagnetic logging while drilling method that comprises:
    assembling a bottomhole assembly of a drill string including a bit that operates to extend a borehole;
    securing at least one readily securable to and removable from add-on antenna unit around a downhole tool or tubular in the drill string, wherein at least one of the at least one add-on antenna units is not connected to a sidewall readout port of the downhole tool or tubular in the drill string; and
    using the at least one add-on antenna unit in combination with at least one other antenna in the drill string to obtain electromagnetic signal measurements indicative of at least one formation property, wherein the at least one add-on antenna unit is positioned and oriented on the downhole tool or tubular in an azimuthally-sensitive configuration to acquire the electromagnetic signal measurements to enable improved determination of the at least one formation property, thereby providing increased configuration flexibility.

11. The method of claim 10, wherein the at least one formation property comprises at least one of: conductivity, permittivity, distance to a bed boundary, and direction of a bed boundary.

12. The method according claim 10, wherein the at least one other antenna comprises a transmitting antenna of an electromagnetic logging while drilling tool.

13. The method according to claim 10, wherein the at least one other antenna comprises a receiving antenna of a second add-on antenna unit.

14. The method according to claim 10, wherein the at least one other antenna is spaced apart from said tool or tubular by at least one intermediate tool or tubular.

15. The method of claim 10, wherein said tool or tubular comprises a logging while drilling tool having the sidewall readout port, and wherein said securing includes electrically connecting the at least one add-on antenna unit to the sidewall readout port to receive power.

16. The method of claim 15, wherein said using includes communicating with the at least one add-on antenna unit over an internal tool bus via the sidewall readout port.

17. The method of claim 10, wherein the at least one add-on antenna unit communicates receive signal parameters to an electromagnetic logging controller via a short-hop wireless communications link.

18. The method of claim 10, wherein said using includes synchronizing operation of the at least one add-on antenna unit with operation of the at least one other antenna.

19. An add-on antenna unit, readily securable to and removable from a downhole tool in a bottomhole assembly, for securing to the downhole tool in the bottomhole assembly, the add-on antenna unit comprising:
    at least one coil antenna for cooperating with at least one other add-on antenna units in the bottomhole assembly to provide electromagnetic signal measurements indicative of at least one formation property; and
    an electronics module that removably couples to a sidewall readout port in the downhole tool to receive power and to exchange messages with the at least one other antenna unit, wherein the add-on antenna unit is positioned and oriented on the downhole tool in an azimuthally-sensitive configuration to acquire the electromagnetic signal measurements to enable an improved determination of the at least one formation property, thereby providing increased configuration flexibility, wherein at least one of the at least one other add-on antenna units is not connected to a sidewall readout port of another downhole tool in the bottomhole assembly.

20. The add-on antenna unit of claim 19, wherein the add-on antenna unit further comprises a ferromagnetic core having an aperture for attaching the electronics module to the sidewall readout port.

* * * * *